United States Patent
Felch et al.

(10) Patent No.: US 10,189,723 B2
(45) Date of Patent: Jan. 29, 2019

(54) MULTI-MEDIA STRATIFIED FILTRATION

(71) Applicant: Siemens Energy, Inc., Orlando, FL (US)

(72) Inventors: Chad L. Felch, Kronenwetter, WI (US); Eric A. Lorge, Kronenwetter, WI (US); Shane P. Wiercinski, Wausau, WI (US); Matthew R. Patterson, Hatley, WI (US)

(73) Assignee: SIEMENS ENERGY, INC., Orlando, FL (US)

( * ) Notice: Subject to any disclaimer, the term of this patent is extended or adjusted under 35 U.S.C. 154(b) by 305 days.

(21) Appl. No.: 15/112,064

(22) PCT Filed: Jan. 22, 2015

(86) PCT No.: PCT/US2015/012354
§ 371 (c)(1),
(2) Date: Jul. 15, 2016

(87) PCT Pub. No.: WO2015/112664
PCT Pub. Date: Jul. 30, 2015

(65) Prior Publication Data
US 2016/0347626 A1  Dec. 1, 2016

Related U.S. Application Data

(60) Provisional application No. 61/930,495, filed on Jan. 23, 2014.

(51) Int. Cl.
*C02F 1/28* (2006.01)
*B01D 17/02* (2006.01)
(Continued)

(52) U.S. Cl.
CPC .......... *C02F 1/288* (2013.01); *B01D 17/0202* (2013.01); *B01D 17/045* (2013.01);
(Continued)

(58) Field of Classification Search
CPC ... B01D 17/045; B01D 17/0202; C02F 1/285; C02F 1/286; C02F 1/288; C02F 2101/32;
(Continued)

(56) References Cited

U.S. PATENT DOCUMENTS 4,329,226 A     5/1982  Thompson
4,530,767 A  *  7/1985  Hirs ................... B01D 17/0205
                                                      210/708
(Continued)

FOREIGN PATENT DOCUMENTS

CN     2321513 Y   6/1999
CN     2472784 Y   1/2002
(Continued)

*Primary Examiner* — Patrick J Orme

(57) ABSTRACT

According to various aspects and embodiments, a system and method for treating a feed stream comprising hydrocarbons, suspended solids, and an aqueous-based liquid is provided. The systems and methods may utilize a stratified multi-media bed that includes at least one layer of a composite media comprising a mixture of a cellulose-based material and a polymer. According to certain aspects, contacting the feed stream with the stratified multi-media bed comprises coalescing and filtering the feed stream. According to at least one aspect, the systems and methods include a draft tube positioned within the stratified multi-media bed that may be utilized for backwashing the layers of filter media.

11 Claims, 8 Drawing Sheets

(51) Int. Cl.
*B01D 17/04* (2006.01)
*C02F 101/32* (2006.01)
*C02F 103/36* (2006.01)

(52) U.S. Cl.
CPC .............. *C02F 1/285* (2013.01); *C02F 1/286* (2013.01); *C02F 2101/32* (2013.01); *C02F 2103/365* (2013.01); *C02F 2209/03* (2013.01); *C02F 2303/16* (2013.01)

(58) Field of Classification Search
CPC ............ C02F 2103/365; C02F 2209/03; C02F 2303/16
See application file for complete search history.

(56) References Cited

U.S. PATENT DOCUMENTS

| | | | |
|---|---|---|---|
| 5,350,505 | A | 9/1994 | Tang |
| 5,543,037 | A | 8/1996 | Hering, Jr. |
| 2003/0047522 | A1* | 3/2003 | Gannon ................. B01D 15/00 210/799 |
| 2011/0163049 | A1* | 7/2011 | Felch ...................... C02F 1/004 210/794 |
| 2012/0223020 | A1* | 9/2012 | Felch ................... B01D 17/045 210/708 |

FOREIGN PATENT DOCUMENTS

| | | |
|---|---|---|
| CN | 101186400 A | 5/2008 |
| CN | 103111104 A | 5/2013 |
| GB | 1442085 A | 7/1976 |
| JP | S5633013 A | 4/1981 |
| JP | S59123505 A | 7/1984 |
| JP | S63315108 A | 12/1988 |
| JP | H03249994 A | 11/1991 |
| KZ | 18699 A | 8/2007 |
| RU | 2206520 C1 | 6/2003 |
| RU | 2311228 C1 | 11/2007 |
| RU | 2503483 C2 | 1/2014 |
| WO | 2010036690 A1 | 4/2010 |
| WO | 2012119033 A1 | 9/2012 |

* cited by examiner

MULTI-MEDIA STRATIFIED FILTRATION

This application is a U.S. National Stage of International Application No. PCT/US2015/012354, filed Jan. 22, 2015, which claimed priority to U.S. Provisional Patent Application No. 61/930,495, titled "MULTI MEDIA STRATIFIED FILTRATION," filed on Jan. 23, 2014, each application of which is incorporated herein by reference in its entirety.

FIELD OF THE TECHNOLOGY

Aspects relate generally to treatment of liquids and, more particularly, to methods for removing hydrocarbons and suspended solids from aqueous-based liquids.

SUMMARY

In accordance with one or more embodiments, a system for treating a feed stream comprising hydrocarbons and an aqueous-based liquid is provided. The system comprise a vessel comprising a feed stream inlet fluidly connectable to the feed stream and a treated stream outlet in communication with a treated stream, a first layer of filter media positioned within the vessel, a second layer of filter media positioned within the vessel, a draft tube located within the vessel and positioned within the first layer of filter media and the second layer of filter media, a gas inlet in communication with the draft tube, a source of gas in communication with the gas inlet, a backwash fluid inlet fluidly connectable to a source of backwash fluid and at least one of the first layer of filter media and the second layer of filter media, and a contaminant outlet.

According to some embodiments, the first layer of filter media and the second layer of filter media are positioned within the vessel between the feed stream inlet and the treated stream outlet. According to a further embodiment, the second layer of filter media is positioned below the first layer of filter media. In accordance with at least one embodiment, the first layer of filter media has a specific gravity with a value that is less than a value of a specific gravity of the second layer of filter media.

According to certain embodiments, the backwash fluid inlet is positioned below the second layer of filter media. According to some embodiments, the contaminant outlet is positioned below the feed inlet.

In accordance with some embodiments, the first layer of filter media comprises a plurality of composite media pellets, each pellet of composite media comprising a mixture of a cellulose-based material and a polymer. According to a further embodiment, each composite media pellet has a size in a range of from about 5 to about 30 mesh.

According to another embodiment, the first layer of filter media and the second layer of filter media comprise composite media pellets.

According to another embodiment, the second layer of filter media comprises walnut shells. According to a further embodiment, the walnut shells have a size in a range of from about 12 to about 16 mesh.

In accordance with certain embodiments, a volume of the first layer of filter media is at least about twice a volume of the second layer of filter media.

According to some embodiments, the gas inlet is positioned within the draft tube In accordance with some embodiments, the treated stream has a hydrocarbon concentration of less than about 5 mg/L.

In accordance with one or more embodiments, a method for treating a feed stream comprising hydrocarbons and an aqueous-based liquid is provided. The method comprises introducing the feed stream to a vessel containing a first layer of filter media and a second layer of filter media, at least one of the first layer of filter media and the second layer of filter media comprising a plurality of composite media pellets, each composite media pellet comprising a mixture of cellulose-based material and a polymer, and contacting the feed stream with the first layer of filter media and the second layer of filter media to produce a treated stream having a concentration of hydrocarbons that is less than a concentration of hydrocarbons in the feed stream.

According to some embodiments, contacting the feed stream with the first layer of filter media and the second layer of filter media produces a treated stream with a hydrocarbon concentration of less than about 5 mg/L.

According to some embodiments, the feed stream further comprises suspended solids. According to another embodiment, contacting the feed stream with the first layer of filter media and the second layer of filter media produces a treated stream having a concentration of suspended solids that is less than a concentration of suspended solids in the feed stream. According to various embodiments, the method further comprises passing a gas through a draft tube in a direction counter a flow of the feed stream, the draft tube located within the vessel and positioned within the first layer of filter media and the second layer of filter media and forming a peripheral zone positioned between a sidewall of the draft tube and a sidewall of the vessel, passing a backwash fluid through the first and second layers of filter media and the peripheral zone in a direction counter the flow of the feed stream, and removing at least a portion of the hydrocarbons and suspended solids from the vessel. According to at least one embodiment, the method further comprises measuring at least one property of the vessel to provide a measured property, and passing at least one of the gas and the backwash fluid based on the measured property.

According to at least one embodiment, the first layer of filter media comprises a plurality of composite media pellets, and the second layer of filter media comprises walnut shells.

According to another embodiment, the first and second layers of filter media comprise a plurality of composite media pellets.

In accordance with at least one embodiment, contacting the feed stream with the first layer of filter media and the second layer of filter media comprises coalescing and filtering the feed stream. In accordance with another embodiment, contacting the feed stream with the first layer of filter media comprises coalescing the feed stream. In accordance with yet another embodiment, contacting the feed stream with the second layer of filter media comprises filtering the feed stream.

Still other aspects, embodiments, and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Embodiments disclosed herein may be combined with other embodiments, and references to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
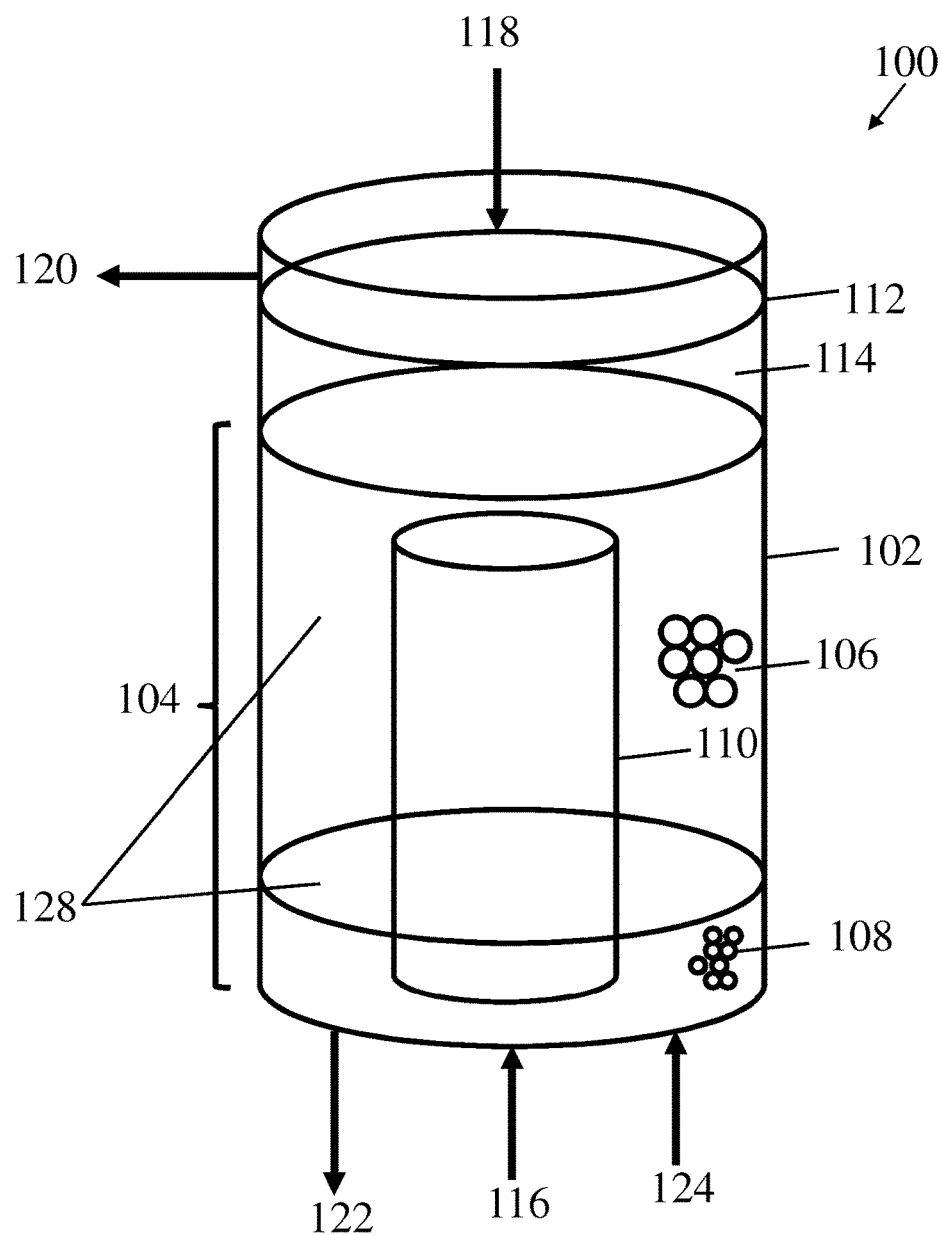
FIG. 1 is a side view of a hydrocarbon and water separation apparatus in accordance with one or more aspects of the disclosure.

Aspects of the disclosure are directed to wastewater treatment systems utilizing a stratified filter multi-media bed. "Wastewater," as used herein, defines any wastewater to be treated such as surface water, ground water, and a stream of wastewater from industrial and municipal sources having contaminants such as oil and/or suspended solids. The processes disclosed herein to treat the wastewater include coalescing, separation, and filtration techniques. For example, aqueous liquids may comprise suspended solids or liquids that may be treated by one or more of filtration, coalescing, and separation processes. One or more of these processes may include contacting the liquid with filter media. In certain instances, contacting the liquid with filter media may occur by passing the liquid through a stratified multi-media bed packed with one or more types of filter media. The stratified multi-media bed may provide high oil capacity and improves effluent quality. Further, the filter media may be capable of being backwashed without having to remove the media from the vessel.

In accordance with at least one embodiment, a filter media apparatus is provided that comprises a vessel containing a stratified multi-media bed comprising a first layer of media and a second layer of media positioned within the vessel. According to some embodiments, the second layer of filter media may be positioned below the first layer of media. According to one embodiment, the first layer of media may comprise composite media, as discussed further below, and the second layer of media may comprise walnut shells, also discussed below. The composite media may comprise a particles or pellets capable of collecting about 3 to about 5 times more oil than walnut shells alone, but due to the size of the particles or pellets, may also allow for some suspended solids, such as small suspended solids, to escape. Walnut shells may be used as filtration media to adsorb oil and filter suspended solids. Therefore, the walnut shells may be used in combination with the composite media to filter at least a portion of the suspended solids not captured by the composite media. Further, the stratified multi-media bed may be more effective at removing hydrocarbons and suspended solids from a feed stream than filter media beds that contain only a single type of filter media.

The aspects disclosed herein in accordance with the present invention, are not limited in their application to the details of construction and the arrangement of components set forth in the following description or illustrated in the accompanying drawings. These aspects are capable of assuming other embodiments and of being practiced or of being carried out in various ways. Examples of specific implementations are provided herein for illustrative purposes only and are not intended to be limiting. In particular, acts, components, elements, and features discussed in connection with any one or more embodiments are not intended to be excluded from a similar role in any other embodiments.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated reference is supplementary to that of this document; for irreconcilable inconsistencies, the term usage in this document controls. Moreover, titles or subtitles may be used in the specification for the convenience of a reader, which shall have no influence on the scope of the present invention.

Filter media, also referred to as simply "media," may be useful for a variety of processing techniques and applications, including filtering, coalescing, separating, increasing residence time of a liquid in a vessel containing the media, and functioning as an adsorbant or absorbent. For example, filter media may be used for separating liquids from gases, liquids from other liquids, and separating suspended solids, colloidal, and particulate matter from a fluid stream. In addition, filter media may be used to coalesce smaller droplets of one or more components in a liquid into larger droplets. For example, media filters may be used for the removal of suspended solids and free oil from one or more solutions.

Media filters may be used in oil refineries and oil wells, petrochemical plants, chemical plants, natural gas processing plants, and other industrial processes for purposes of oil and water separation. Separation techniques in these industrial processes may be categorized into primary, secondary and tertiary stages. Primary separation techniques may reduce oil concentrations to about 500 to about 200 ppm. Secondary separation techniques may reduce oil concentrations to about 100 to about 20 ppm. Tertiary separation techniques may be capable of removing free oil from starting levels ranging from about 20 ppm to about 100 ppm down to levels that are below about 10 ppm. Non-limiting examples of separation techniques include API separators and gravity clarifiers, coalescing and flotation devices, API flotation devices, dissolved air flotation (DAF) devices, dissolved gas flotation (DGF) devices, compact flotation devices, hydrocyclones, and media bed filters. There is current demand for media filters on oil platforms (also referred to as "off shore") in order to comply with regulatory requirements on wastewater discharge. The footprint and weight of the equipment are critical factors in determining what equipment will be used on off-shore oil platforms. Consequently, a media bed that is more efficient in removing oil from water than that which is currently available may permit the size and weight of the equipment to be greatly reduced. In certain instances, the media bed may be located downstream from primary and/or secondary treatments. According to various aspects, a stratified multi-media bed is provided that is capable of taking water from a primary separation step, such as a hydrocyclone or API flotation device and treating it to meet tertiary water requirements. For example, the systems and methods disclosed herein may reduce the concentration of hydrocarbons in the effluent to be less than 10 ppm, and in certain instances less than 5 ppm, which eliminates one or more of the secondary and/or tertiary treatments. This capability lowers capital costs and reduces the footprint of the processing operation.

In accordance with one or more embodiments, the systems and methods described herein relate to a system and method for treating a feed stream. According to certain aspects, the feed stream may comprise one or more components. In certain instances, the feed stream may comprise one or more components that are in the same phase, for example, one or more liquids. In other instances, the feed stream may comprise one or more components that are in different phases, for example, one or more gas and liquid combinations, and one or more solid and liquid combinations. In certain applications, the feed stream may comprise one or more suspended solids, colloids and particulate matter. According to various aspects, the feed stream may comprise an aqueous-based liquid. In certain aspects, the feed stream may comprise a hydrocarbon liquid(s) which are also referred to herein as hydrocarbons, and an aqueous-based liquid. The feed stream may further include suspended solids. In certain aspects, the system may receive one or more feed streams from industrial sources. For example, the feed stream may originate from oil refineries, oil wells, petrochemical plants, chemical plants, natural gas processing plants, and other industrial processes.

In certain embodiments, the system may receive one or more feed streams comprising hydrocarbons and an aqueous-based liquid. According to a further embodiment, the feed stream may also comprise suspended solids. As used herein, the term "hydrocarbon" refers to organic material with molecular structures containing carbon bonded to hydrogen. Hydrocarbons may also include other elements, such as, but not limited to, at least one of halogens, metallic elements, nitrogen, oxygen, and sulfur. As used herein, the term "hydrocarbon liquid" or simply "hydrocarbons" refers to a liquid phase hydrocarbon fluid or to a mixture of liquid phase hydrocarbon fluids. The hydrocarbon liquid may comprise additional substances, for example, solid particles. Non-limiting examples of hydrocarbon liquids may include, for example, crude oil, natural gas, shale oil, pyrolysis oil, and any combination thereof. As used herein, the terms "aqueous-based liquid," and "aqueous stream" refer to liquids comprising water. The liquid may comprise additional substances, which may be solids, including suspended solids, liquids, gases, or any combination thereof. The methods and systems described herein may refer to a feed stream comprising hydrocarbons, suspended solids, and an aqueous-based liquid, but should not be limited as such. For example, it may be possible to treat one or more other types of liquids according to the methods and systems described herein.

In certain embodiments, the feed stream may be introduced to a vessel. For example, the feed stream may be introduced to an inlet of the vessel, also referred to herein as a feed stream inlet, that may be positioned at the top of the vessel, the bottom of the vessel, or anywhere in between that is suitable for accomplishing the methods and systems described herein. As used herein, the term "vessel" broadly means any structure suitable for confining one or more process components, including gas, liquid and solid components and mixtures thereof. The vessel may be open to the environment or may be closed to operate under pressure. In certain applications, the vessel may be constructed to provide an anaerobic or aerobic environment for the components. The vessel may be sized and shaped according to a desired application and volume of feed to be treated to provide at least one of a desired throughput and a desired period of operation before a backwash is initiated. The vessel may also comprise a filtrate outlet, where effluent, otherwise referred to herein as a treated stream, may exit the vessel.

The vessel may have a bed to accommodate one or more types of filter media at a desired depth based upon the desired volume of feed to be treated and the type of filter media selected for the particular application. Accordingly, the vessel may have any bed depth of media that is suitable for the purposes of the methods and systems described herein. The vessel may be constructed of any material suitable for the purposes of the methods and systems described herein. Non-limiting examples of suitable materials include steel, stainless steel, fiberglass reinforced plastic, and polyvinyl chloride (PVC). One or more embodiments may include a vessel having one or more sidewalls depending upon the desired shape of the vessel. For example a cylindrical vessel may have one sidewall while a square or rectangular vessel may have four side walls. In certain embodiments, the vessel may have a cylindrical shape having one continuous sidewall positioned between the first and second walls. In certain other embodiments, the vessel may be closed wherein one or more sidewalls extend between a first wall and a second wall.

According to certain embodiments, the vessel may contain one or more types of filter media. In certain embodiments, the filter media may comprise a plurality of particles or pellets that may enhance the treatment of a feed stream as compared to a process that does not treat the feed stream with the filter media. In accordance with some embodiments, the vessel may include multiple layers of media. For example, the vessel may comprise a first layer of filter media and a second layer of filter media. In some embodiments, the second layer of filter media is positioned below the first layer of filter media. Examples of suitable media for the systems and methods disclosed herein are discussed further below. According to at least one embodiment, the first layer of filter media has a specific gravity with a value that is less than a value of specific gravity of the second layer of filter media. The media may be comprised of any particle size and shape, including irregularly shaped particles. Any filter media may be used so long as it is suitable for at least one of (1) coalescing at least one hydrocarbon liquid and (2) filtering at least one stream comprising a hydrocarbon liquid, suspended solids, and an aqueous liquid. Two examples of filter medias suitable for the methods and systems described herein may be composite media and walnut shells. According to various embodiments, the media is capable of being backwashed. In certain embodiments, the media is capable of being fluidized. In accordance with various aspects, the media exhibits at least one of adsorbing and absorbing properties toward at least one of hydrocarbons, suspended solids, and aqueous-based liquids.

The layers of filter media may be positioned in the vessel at pre-selected depths and may fill the entire volume of the vessel or be contained in a particular portion of the vessel. For example, in certain instances a portion of the volume of the vessel adjacent one or more walls may be free of media. Filter media may be contained within the vessel by one or more dividers, such as screens or perforated plates, which may retain the filter media in a desired location within the vessel while allowing one or more liquids to flow throughout the media in the vessel.

Composite Media

According to some embodiments, the vessel may contain at least one layer of media, for example, filter media that is a composite media. As used herein, the terms "media composite" and "composite media" are used interchangeably and refer to a combination of two or more different materials. In each of the particles or pellets in the plurality of particles or pellets of the filter media, suitable examples of composite media are disclosed in U.S. application Ser. Nos. 13/410,420 and 14/305,724, both of which are incorporated herein by reference. In at least one embodiment, the composite media comprises a plurality of particles or pellets, each particle or pellet comprising a mixture of a cellulose-based material and a polymer. For example, the composite media may comprise a heterogeneous mixture of a cellulose-based material and a polymer. The heterogeneous mixture may comprise the ingredients or constituents such that the components are not distributed uniformly throughout the mixture. As used herein, the term "heterogeneous mixture" refers to a composite of two or more dissimilar ingredients or constituents. According to one example, the composite media may comprise a homogeneous mixture of a cellulose-based material and a polymer. In one embodiment, the composite media may comprise the cellulose-based material and polymer such that the two materials are secured to one another but are not mixed with one another. As used herein, the term "homogeneous mixture" refers to a composite that is a single-phase composite of two or more compounds that are distributed in a uniform ratio or in a substantially uniform ratio throughout the mixture so that any portion of the composite exhibits the same ratio of the two or more compounds.

Particles of the composite media may have a slightly uneven or mottled appearance due to the combination (heterogeneous or homogeneous) of two or more components. According to some examples, the two or more different materials of the composite media form a matrix with each other so that the two or more materials are interspersed with one another. For example, the particles of composite media may be porous. The pores are formed during fabrication of the composite media and may be present between elements of the same component and mixtures of elements of two or more different materials. According to at least one embodiment, the particles of composite media may be porous. As used herein, "porosity" refers to the percentage of void space, or air space, of a particle and represents the ratio of void area to total surface area.

According to certain aspects, the particles of the composite media are prepared by combining and mixing two components, for example, the cellulose-based material and the polymer, at a predetermined ratio and then extruding the material through an extruder. The blended material is then cut into individual particles, the shape and size of which is discussed further below. For example, the particles may be pellets.

According to least one aspect, the composite media comprises a plurality of uniformly shaped particles. As used herein, the term "uniformly shaped particles" refers to exactly the same shaped and size particles, and substantially the same shaped and sized particle while tolerating some degree of difference in shape attributable to, for example, manufacturing error. Suitable shapes for the particles of the composite media may include spheres and cylinders. For example, the composite media may comprise a plurality of uniformly shaped cylinder or cylinder-like shapes. The composite media may be of any shape that would allow for gaps in the interstitial area between the particles, and may be referred to here as pellets. In certain embodiments, the composite media may comprise a plurality of irregularly shaped particles. According to at least some embodiments, each particle is made up of a homogeneous or a heterogeneous mixture of a cellulose-based material and a polymer.

According to at least one example, the particle of composite media is a pellet. The composite media pellets may have a diameter in a range of from about 2 mm to about 10 mm and a height of from about 1 mm to about 5 mm. For example, the pellet may have a diameter of about 4 mm and a height of about 2 mm. In another example, the pellet has a diameter of about 4 mm and a height of about 3.5 mm. According to some embodiments, the pellets may be spherical in shape. In accordance with various embodiments each composite media pellet has a size in a range of from about 5 to about 30 mesh. For example, according to at least one embodiment, the composite media has a size in a range of from about 5 to about 10 mesh. According to other embodiments, the composite media has a size in a range of from about 8 to about 30 mesh.

As used herein, the term "cellulose-based material" refers to any material, product, or composition that contains cellulose. Non-limiting examples may include wood from deciduous and evergreen trees, including wood powder, wood pulp, wood particles, wood fibers, sawdust, wood flakes, wood chips, and any other wood product or cellulose-based product suitable for the methods and systems disclosed herein, such as, coconut, bagasse, peat, pulp-mill waste, corn stalks, and any combination thereof. The media may comprise any wood suitable for the purposes of the methods and systems described herein. In certain instances, the cellulose-based material may be pine wood. In other instances, the cellulose-based material may be maple wood. Other non-limiting examples of wood include spruce, cedar, fir, larch, douglas-fir, hemlock, cypress, redwood, yew, oak, ash, elm, aspen, poplar, birch, maple, teak, walnut, balsa, beech, boxwood, Brazilwood, butternut, cherry, basswood, cottonwood, dogwood, hackberry, hickory, mahogany, bamboo, and willow. Further, according to certain aspects, the cellulose-based material may include more than one type of wood. For example, the cellulose-based component may include two or more species of hardwood, non-limiting examples of which include hickory, maple, oak, beech, birch, ash, walnut, cherry, sycamore, poplar, cottonwood, basswood, and aspen.

Non-limiting examples of polymers suitable for the composite media described here may include polyolefins, including high density polyethylene (HDPE), polyethylene (PE), polypropylene (PP), PVC, ethylene propylene copolymers, fluoropolymers, including Teflon®, and any combination thereof. In certain instances, the polymer is HDPE. In accordance with other aspects, the polymer may include a polymer foam material. The polymer foam may include one or more portions that are porous or the polymer foam may be entirely porous. Polymer foams may be made by the controlled expansion of gas during the polymerization process. The size and shape of the pores within the polymer foam may be of any size or shape suitable for allowing the composite media to perform the various functions disclosed herein. According to various embodiments, the composite media may comprise a concentration of polymer that is from about 20% to about 80% by weight.

According to certain aspects, the composite media comprises a concentration of cellulose-based material of at least about 30%, but may also be at least about 40%, 45%, and 50%. The concentration of cellulose-based material may be any percentage between about 20% and about 80%, or any range of percentages in between these percentages. For example, the composite media comprises a concentration of maple wood of about 50% by weight. According to another example, the composite media comprises a concentration of pine wood of about 70% by weight. According to yet another example, the concentration of pine wood is about 30%.

Specific examples of compositions of composite media that may be used for the systems and methods disclosed herein include (1) 45% HDPE and 55% oak, (2) 70% HDPE and 30% pine, and (3) 70% HDPE and 30% maple wood.

The composite media may also comprise additional components, including chemical components. Non-limiting examples of components that may be suitable to include in the composite media include coagulants and flocculants.

According to at least one embodiment, the composite media may further include an additive material that functions to increase the specific gravity of the composite media. Non-limiting examples of suitable additive materials include diatomaceous earth, silica, bentonite, and calcium carbonate. Other similar materials are also within the scope of this disclosure. The additive material may be any inert material suitable for increasing the specific gravity of the composite media so long as the material is not incompatible with the other components of the composite media. For example, additive materials that dissolve the polymer component are unusable. According to some embodiments, multiple layers of composite media may be used in the vessel, where each layer is segregated based on the specific gravity and/or density and/or size of the layer of composite media. For example, a first layer of composite media may contain filter media that has a specific gravity that is lower than a specific gravity of the filter media in a second layer of composite media positioned below the first layer of composite media. According to a further example, the first layer of composite media may also be sized to be larger than the second layer of composite media. Further, the first layer of composite media may be less dense and/or have a lower specific gravity than the composite media of the second lower layer.

According to some embodiments, the composite media may have a specific gravity with a value less than about 1.1. For example, the specific gravity of the composite media may be in a range from about 0.7 to about 0.9. According to some embodiments, the composite media may have a density of less than about 0.6 kg/m$^3$. For example, the composite media may have a density of about 0.4 kg/m$^3$. In instances where the composite media is used with walnut shells, the composite media may have a specific gravity that is lower than that of the walnut shells, and may have also have a lower density than the walnut shells.

Walnut Shell Media

In accordance with some embodiments, a suitable filter media for use in the systems and methods disclosed herein includes walnut shell filter media, such as media made from English walnut shells and black walnut shells. For example, black walnut shells and English walnut shells may be used to coalesce and filter wastewater containing oil, as disclosed in U.S. application Ser. Nos. 13/119,497 and 13/120,501, both of which are incorporated herein by reference. Walnut shells may be used in a filter device where water containing oil is introduced in a downward flow through a bed of walnut shells, where oil is adsorbed and suspended solids are filtered. Walnut shells have an equal affinity for oil and water, which makes it possible for oil to be captured on the surface of the walnut shells and then scrubbed off during a backwash cycle, thereby allowing the walnut shells to be re-used.

Although the examples herein include walnut shells as an example filter media, other types of filter media may also be used in lieu or in combination with the walnut shell media. Non-limiting examples include other types of shells from nuts, such as shells from pecans, pine nuts, pistachios, brazil nuts, coconuts, and almonds. Non-limiting examples of other types of filter media may include activated carbon, anthracite, sand, diatomaceous earth, charcoal, and other cellulosic materials, as discussed above.

In accordance with some embodiments, the walnut shell media is comprised of walnut shells having a size in a range of from about 12 to about 20 mesh. According to at least one embodiment, the walnut shells have a size in a range of from about 12 to about 16 mesh.

According to some embodiments, the walnut shell media may have a specific gravity of greater than about 1.2. For instance, the walnut shell media may have a specific gravity with a value in a range of from about 1.2 to about 1.4.

According to some embodiments, the walnut shell media may have a density of greater than about 300 kg/m$^3$. For example, the walnut shell media may have a density in a range of from about 300 to about 1200 kg/m$^3$.

Filter Apparatus

In accordance with at least one embodiment, a system for treating a feed stream comprising hydrocarbons, suspended solids, and an aqueous-based liquid is illustrated by the filter media apparatus, generally indicated at 100, in FIG. 1. The filter media apparatus 100 includes a vessel 102, as discussed and described above, comprising a feed stream inlet 118 in communication or fluidly connectable with the feed stream, as discussed above. The vessel may also comprise a treated stream or filtrate outlet 122 in communication or fluidly connectable with a treated stream. As used herein, the term "fluidly connectable" refers to the ability for fluid to flow from one element to another element. There may be numerous components, such as piping, valves, pumps, measuring devices, etc. interposed between such elements, which are not necessarily claimed as part of this disclosure and which are simply part of the fluid connection or potential fluid connection. The filter media apparatus 100 may also include a stratified multi-media bed 104 that includes two or more layers of filter media. For example, a first layer of filter media 106 may be positioned within the vessel 102 between the feed stream inlet 118 and the treated stream outlet 122, and a second layer of filter media 108 may be positioned within the vessel below the first layer of filter media 106 and between the feed stream inlet 118 and the treated stream outlet 122. Filter media is represented in the figures as uniform spherical particles, however, it is understood that the filter media may be comprised of any particle size and shape, including irregularly shaped particles. Further, the filter media in the figures is represented as only filling a portion of the designated layer, such as first layer 106 and second layer 108, but it is understood that the filter media may comprise the entire layer.

According to some embodiments, the first layer of filter media 106 may have a specific gravity with a value that is less than a value of a specific gravity of the second layer of filter media 108. For example, the first layer of filter media 106 may comprise composite media, such as the composite media pellets discussed and described above, and the second layer of filter media may comprise walnut shells. According to a further embodiment, each composite media pellet may have a size in a range of from about 5 to about 30 mesh, and the walnut shells may have a size in a range of from about 12 to about 16 mesh.

Figure 2:
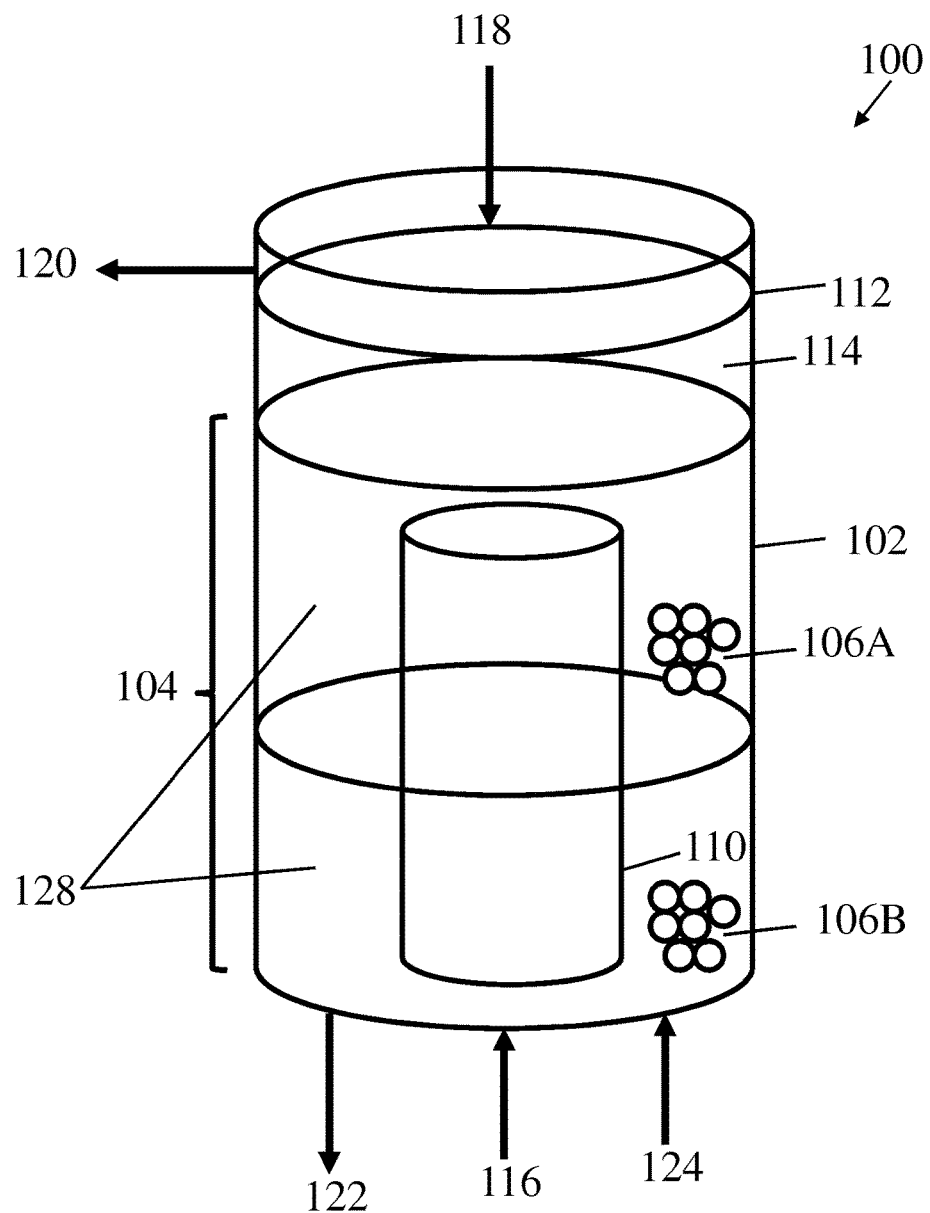
FIG. 2 is a side view of another hydrocarbon and water separation apparatus in accordance with one or more aspects of the disclosure.

In accordance with some embodiments, and in reference to FIG. 2, a first layer of filter media 106A and a second layer of filter media 106B positioned below the first layer 106A may each comprise composite media. For example, the composite media of the first layer 106A may have a specific gravity that is lower than the composite media of the second layer. This may be accomplished by using composite media in the second layer 106B that includes an additive, such as diatomaceous earth, that increases the specific gravity of the filter media.

According to some embodiments, the volume of filter media of each of the first layer of media 106 and the second layer of media 108 may be substantially the same. As used herein, the term "volume" refers to the amount of space occupied by the filter media in its respective layer, including the interstitial space. According to other embodiments, the volumes of the first layer of filter media 104 and the second layer of filter media 108 may be different. For example, the volume of the first layer of filter media 106 may be at least about twice the volume of the second layer of filter media 108. According to other embodiments, the volume of the first layer of filter media 106 may be about 2 to about 10 times the volume of the second layer of filter media 108. For example, the volume of the first layer of filter media may be at least about 3 times, at least about 4 times, at least 5 about times, or at least about 6 times the volume of the second layer of filter media 108. In accordance with one embodiment, the volume of the first layer of filter media 106 is at least about 6 times the volume of the second layer of filter media 108. According to a different embodiment, the volume of the second layer of filter media 108 is about 2 to about 10 times the volume of the first layer of filter media 106. The proportions of each type of filter media comprising the stratified multi-media filter bed 104 may be of any value that are suitable for the purposes of performing at least one of a filtering and coalescing function as described in the methods and systems disclosed herein. The proportion of each type of filter media may also be chosen to provide a certain process capability, for example, by providing for a desired amount of filtration processing time to go by before backwashing is necessary.

In accordance with certain embodiments, the stratified multi-media filter bed 104 functions to both coalesce and filter hydrocarbons and suspended solids from the feed stream. For example, as used herein, "coalescing" refers broadly to the combining and/or uniting of one or more smaller droplets of a liquid or other phase to form at least one of a larger droplet, a phase, and a layer. For example, in certain aspects, coalescing may increase the droplet size of a hydrocarbon liquid from a diameter of less than about 20 microns to a size that is greater than about 20 microns. In certain other aspects, coalescing may increase the droplet size of a hydrocarbon liquid from a diameter of less than about 20 microns to a size that is greater than about 50 microns. In some aspects, coalescing may produce a droplet size of a hydrocarbon liquid that is greater than about 50 microns. In some aspects, coalescing may produce a droplet size of a hydrocarbon liquid that may be greater than about 100 microns. As used herein, the term "coalesced stream" refers to a liquid where the droplets of a liquid or other phase form a droplet of at least about 20 microns in diameter. In at least one aspect, a coalesced stream may refer to a liquid where the droplets of hydrocarbon liquid are at least about 20 microns in diameter. In some aspects, the coalesced stream may refer to a liquid where the droplets of hydrocarbon liquid are at least about 20 microns in diameter, at least about 30 microns in diameter, at least about 30 microns in diameter, at least about 100 microns in diameter, and any combination thereof. According to various embodiments, at least one layer of the stratified multi-media bed may be configured to produce a coalesced stream. For instance, a layer of composite media may coalesce the feed stream to produce a coalesced stream. According to a further aspect, the coalesced stream may be further passed to another layer of filter media, where it is filtered to produce a final treated stream.

According to certain embodiments, the stratified multi-media filter bed 104 also functions to filter hydrocarbons and suspended solids from the feed stream. As used herein, the terms "filtering" and "separating" broadly refer to any process used to separate a constituent of a substance from other constituents of the substance. For example, filtering may refer to a process for separating one or more phases from each other. In certain aspects, filtering may separate two liquid phases. In other aspects, filtering may separate a solid from a liquid phase. In at least one embodiment, filtering refers to a process for separating at least one of hydrocarbons and suspended solids from an aqueous-based liquid.

According to certain embodiments at least one of coalescing and filtering may be performed by each layer of the stratified multi-media bed 104. For example, the first layer of filter media 106 may function to coalesce the feed stream, and the second layer of filter media 108 may function to filter the feed stream. For instance, the first layer of filter media 106 may comprise composite media that functions to coalesce the feed stream, and the second layer of filter media 108 may comprise walnut shells that function to filter the feed stream. According to other embodiments, either of the first layer of filter media 106 or the second layer of filter media 108 may function to both coalesce and filter at least a portion of the feed stream. For instance, a first layer of composite media pellets may both coalesce and filter the feed stream, and the second layer of walnut shells may filter the feed stream.

In accordance with various embodiments, the feed stream may have a hydrocarbon concentration of from about zero to about 1000 mg/L. For instance, the feed stream may have a hydrocarbon concentration of from about 100 to about 1000 mg/L. According to other embodiments, the feed stream may have a hydrocarbon concentration of from about 250 to about 1000 mg/L. According to yet other embodiments, the feed stream may have a hydrocarbon concentration of from about 500 to about 1000 mg/L. Further, the feed stream may have a concentration of total suspended solids (TSS), also referred to herein as simply "suspended solids" of from about zero to about 5 mg/L. According to some embodiments, the feed stream may have a TSS concentration of from about zero to about 10 mg/L. According to other embodiments, the feed stream may have a TSS concentration of from about zero to about 20 mg/L. According to yet other embodiments, the feed stream may have a TSS concentration of from about zero to about 30 mg/L. According to other embodiments the feed stream may have a TSS concentration that is greater than 30 mg/L. The systems and methods of the present disclosure may consistently provide for a treated stream having a concentration of suspended solids of less than about 5 mg/L based on a feed stream having a variable concentration of suspended solids of from about 10 to about 50 mg/L.

According to one or more embodiments, contacting the feed stream with the stratified multi-media bed 104 produces a treated stream comprising a predetermined target concentration of hydrocarbon liquid. For instance, contacting the feed stream with the stratified multi-media bed may produce a treated stream with a concentration of hydrocarbons that is less than a concentration of hydrocarbons in the feed stream. In certain embodiments, the concentration of hydrocarbons in the treated stream is less than about 30 mg/L. In other embodiments, the concentration of hydrocarbons in the treated stream is less than about 10 mg/L. In some embodiments, the concentration of hydrocarbons in the treated stream is less than about 5 mg/L. The concentration of hydrocarbons in the treated stream may be any target concentration that complies with one or more regulatory requirements directed toward discharge concentrations. For example, the concentration of hydrocarbons may be any target concentration in between about zero mg/L to about 200 mg/L, or any range of concentrations in between these target values.

In accordance with some embodiments, contacting the feed stream with the stratified multi-media bed 104 produces a treated stream with a concentration of suspended solids that is less than a concentration of suspended solids in the feed stream. For example, the treated stream may have a concentration of suspended solids that is less than about 15 mg/L. According to other embodiments, the concentration of suspended solids in the treated stream may be less than about 10 mg/L. According to some embodiments, the concentration of suspended solids in the treated stream may be less than 5 mg/L. According to a further embodiment, the concentration of suspended solids in the treated stream may be about zero mg/L. According to various aspects, the concentration of suspended solids in the treated stream may be a function of particle size distribution, where small suspended solid particles, e.g., less than 5 microns, are more difficult to remove. Further, the desired concentration of suspended solids in the treated stream may be dependent upon a specific application, where some applications have stricter standards than other applications. For example, some applications may require the treated stream to have a TSS concentration that meets government regulations, whereas other applications may require the TSS concentration to be lower than standards set by the government.

Although the examples discussed here include two layers of filter media, it will be appreciated by one of ordinary skill in the art that greater than two layers of filter media may be used. For example, three or four layers of filter media may be used in the vessel, with each successive layer from top to bottom having a specific gravity with a value that is higher than the layer of filter media above it.

According to various embodiments, the feed stream may be introduced to the vessel at a flux rate that is in a range of from about 40 to about 250 gpm/ft$^2$. According to other embodiments, the feed stream may be introduced to the vessel at a flux rate that is less than about 40 gpm/ft$^2$. The flux rate may be any flux rate in between about 1 and about 2000 gpm/ft$^2$, or any range of flux rates in between these flux rates. The flux rate may be any rate that is suitable for the purposes of performing at least one of a coalescing and filtering function as described in the methods and systems disclosed herein. For example, according to some embodiments, the flux rate may be less than about 20 gpm/ft$^2$.

Referring back to FIG. 1, the filter media apparatus 100 may further include a draft tube 110, as discussed in further detail below, that is located within the vessel 102 and positioned within the first layer of filter media 106 and the second layer of filter media 108. The draft tube 110 may be cylindrical in shape, but other shapes may be contemplated so long as the draft tube provides adequate backwashing capability. Each end of the draft tube 110 may be positioned within the first and second layers of filter media such that sufficient filter media is present in the top and bottom of the bed to sufficiently refill the draft tube 110 upon completion of a backwash cycle. A peripheral zone 128 in the vessel 102 is generally referred to herein as a region delineated by the volume of the stratified multi-media bed 104 excluding the space occupied by the filter media in the draft tube 110. A scrub zone 114 in the peripheral zone 128 may be positioned above a top surface of the stratified multi-media bed 104, between the top surface of the first layer of media 106 and a screen 112. Screen 112 may be positioned above the scrub zone 114 adjacent the top end of the vessel 102 to prevent loss of filter media during backwash. The scrub zone 114 is also in the peripheral zone 128 positioned between an upper surface of the stratified multi-media bed 104 and a lower surface of the screen 112. As discussed further below, the filter media exiting the draft tube 110 during the backwash process may enter the scrub zone 114 and be further mixed and thereby release additional oil and suspended solids. FIG. 1 shows a screen 112, though it is understood that any device or structure that maintains the filter media in the vessel may be used. For example, the filter media may be retained by a perforated plate or cylinder as well as a cylindrical screen.

The filter media apparatus 100 may also include a gas inlet 116 in communication with the draft tube 110 and a source of gas, as discussed further below. A backwash fluid inlet 124 may be positioned below the second layer of filter media 108 and in communication with a source of backwash fluid. According to some embodiments, the backwash fluid inlet 124 may be constructed and arranged to deliver backwash fluid to the peripheral zone 128 adjacent the bottom of the vessel 102. The filter media apparatus 100 may also comprise a contaminant outlet 120 for removing contaminants, such as hydrocarbons and suspended solids, from the vessel 102 during the backwash cycle. Optionally, the peripheral zone 128 may comprise one or more other gas or backwash fluid inlets to assist in rolling the bed, as described below.

During filtration, a feed stream comprising hydrocarbons, an aqueous-based liquid, and in certain embodiments, suspended solids, is directed to feed stream inlet 118, passes through screen 112 and enters the first layer of filter media 106 and moves downward through the second layer of filter media 108 and exits the vessel 102 as a treated stream through treated stream outlet 122, where it may be directed to further treatment processes or discharged. Filtration continues through the stratified multi-media bed 104 until it is desirable to clean the filter media by backwashing the filter media. According to some embodiments, backwash may be initiated when the pressure drop across the stratified multi-media bed 104 reaches a predetermined value or when the vessel 102 has been in service for a predetermined length of time.

Draft Tube

In accordance with various embodiments, and referring to FIG. 1, the vessel 102 used for treating the feed stream may be fitted with a draft tube system that includes a draft tube 110. The draft tube system may comprise one or more draft tubes 110 and may be constructed and arranged to intermittently backwash the layers of media by providing a desired volume and/or velocity of backwash fluid to roll the bed. Alternatively, or in addition, the draft tube system may be used during a filtering process. As used herein, "rolling the bed" is defined as the movement of the media during backwash in which media at or near the bottom of the vessel may be partially or completely moved through the draft tube system toward the top of the vessel and back toward the bottom of the vessel, or media at or near the top of the vessel may be moved through the draft tube system toward the bottom of the vessel and back toward the top of the vessel. The draft tube system may be sized and shaped to provide for at least one of a desired volume of media to be backwashed and to operate within a preselected time period for backwash operation. The draft tube system may comprise one or more draft tubes 110 positioned in the filter media. As used herein, a "draft tube" is a structure having one or more sidewalls open at both ends which, when positioned in the filter media, provides a passageway for flow of the filter media during backwash.

The draft tube 110 may be constructed of any material suitable for the particular purposes of the methods and systems described herein. For example, the draft tube 110 may be formed of the same material as the vessel 102 or may be formed of lighter, heavier, more expensive, or less expensive materials. For example, the draft tube 110 may be formed of plastics, including fiberglass reinforced plastics. The draft tube 110 may be preformed for insertion into the vessel 102 or manufactured as part of the vessel 102. As such, the draft tube 110 may be designed to retrofit current filtration devices. According to certain aspects, the draft tube 110 may be supported on the exterior wall of the vessel. Alternatively, the draft tube 110 may be supported on a divider or media retention plate, such as a screen or perforated plate, designed to retain the filter media within a region of the vessel while allowing the flow of liquid and contaminants into and out of the filter media.

An individual draft tube 110 may be sized and shaped according to at least one of a desired application, a volume of media to be backwashed, and to operate within a preselected time period for backwash operation. The draft tube 110 may also be sized and shaped to provide suitable movement or lifting of the filter media during filtering or coalescing. The draft tube 110 may also be sized and shaped to provide a desired level of agitation within the draft tube 110 to partially or completely scrub the filter media, thereby releasing at least one of a portion of hydrocarbons and suspended solids from the filter media.

The desired draft tube system volume may be provided by a single draft tube or by providing multiple draft tubes having a total volume substantially equal to the desired volume. An individual draft tube may have a cross sectional area of any shape, such as circular, elliptical, square, rectangle, or any irregular shape. The individual draft tube may have any overall shape, such as conical, rectangular and cylindrical. In one embodiment, the draft tube is a cylinder. As shown in FIG. 1, the draft tube 110 may be positioned in the filter media so as to be entirely enveloped by the filter media as well as to be entirely filled with the filter media. One or both ends of the draft tube 110 may be constructed and arranged to assist with at least one of the flow of media into and out of the draft tube. For example, the side wall at a first end of the draft tube may include one or more cutouts forming passageways to allow some of the filter media at or near the first end of the draft tube to enter through the sidewall of the draft tube, as discussed in U.S. application Ser. Nos. 13/119,497 and 13/120,501. The cutouts forming the passageways may have any shape to allow a sufficient volume of filter media to enter the draft tube. For example, cutouts may be triangular, square, semicircular, or have an irregular shape. Multiple passageways may be identical to one another and may be uniformly positioned about the first end of the draft tube to equally distribute flow of filter media in the draft tube. The draft tube may also be open at the bottom, and may or may not contain additional cutouts.

The draft tube or draft tubes may be positioned at any suitable location within the filter media. For example, a single draft tube may, but need not, be positioned centrally in relation to the vessel sidewalls. Similarly, multiple draft tubes in a single vessel may be randomly positioned or positioned in a uniform pattern in relation to the vessel sidewalls. In certain instances, a single draft tube is positioned in the filter media in relation to the vessel so that an axis extending from each end of the draft tube is co-axial with an axis parallel to the sidewall of the vessel. Multiple draft tubes in a single vessel may, but need not, be identical in volume or cross sectional area. For example, a single vessel may comprise cylindrical, conical and rectangular draft tubes of varying height and cross sectional area. For example, a vessel may have a first draft tube centrally positioned having a first cross sectional area and a plurality of second draft tubes positioned adjacent the side wall of the vessel in which each of the second draft tubes has a second cross sectional area smaller than the first cross sectional area. According to another example, a vessel has a plurality of identical draft tubes.

According to various aspects, the draft tube may include a baffle to prevent or reduce backflow within the draft tube. The baffle may have any size and shape suitable for a particular draft tube. For example the baffle may be a plate suitably positioned on an inner surface of the draft tube or a cylinder positioned in the draft tube. In one embodiment, the baffle may be a solid or hollow cylinder centrally positioned within the draft tube.

Backwash Process for Releasing Contaminants from Filter Media

Upon initiating a backwash, flow of the feed stream through the feed stream inlet 118 and flow of the treated stream through the treated stream outlet 122 are interrupted. Flow of gas may be initiated through the gas inlet 116 and flow of backwash fluid may be initiated through the backwash fluid inlet 124. According to some embodiments, the backwash fluid may be directed through the treated stream outlet 122, which may eliminate a separate inlet for the backwash fluid. Flow of the gas through the gas inlet 116 may, but need not, occur before flow of the backwash fluid is initiated. For example, flow of the gas and the backwash fluid may begin simultaneously, while according to other examples, the flow of the backwash fluid may begin before flow of the gas is initiated. Further, the gas and the backwash fluid may continuously flow during backwash. Alternatively, the flow of one or both of the gas and the backwash fluid may be intermittent. In certain instances, air continuously flows through the draft tube 110 while water is pulsed into the peripheral zone 128. In certain other instances, the gas may be intermittently supplied to the draft tube 110 while the backwash fluid is continuously supplied during backwash. Other variations and details regarding a pulsed backwash system are described in U.S. application Ser. Nos. 13/119,497 and 13/120,501.

Figure 4:
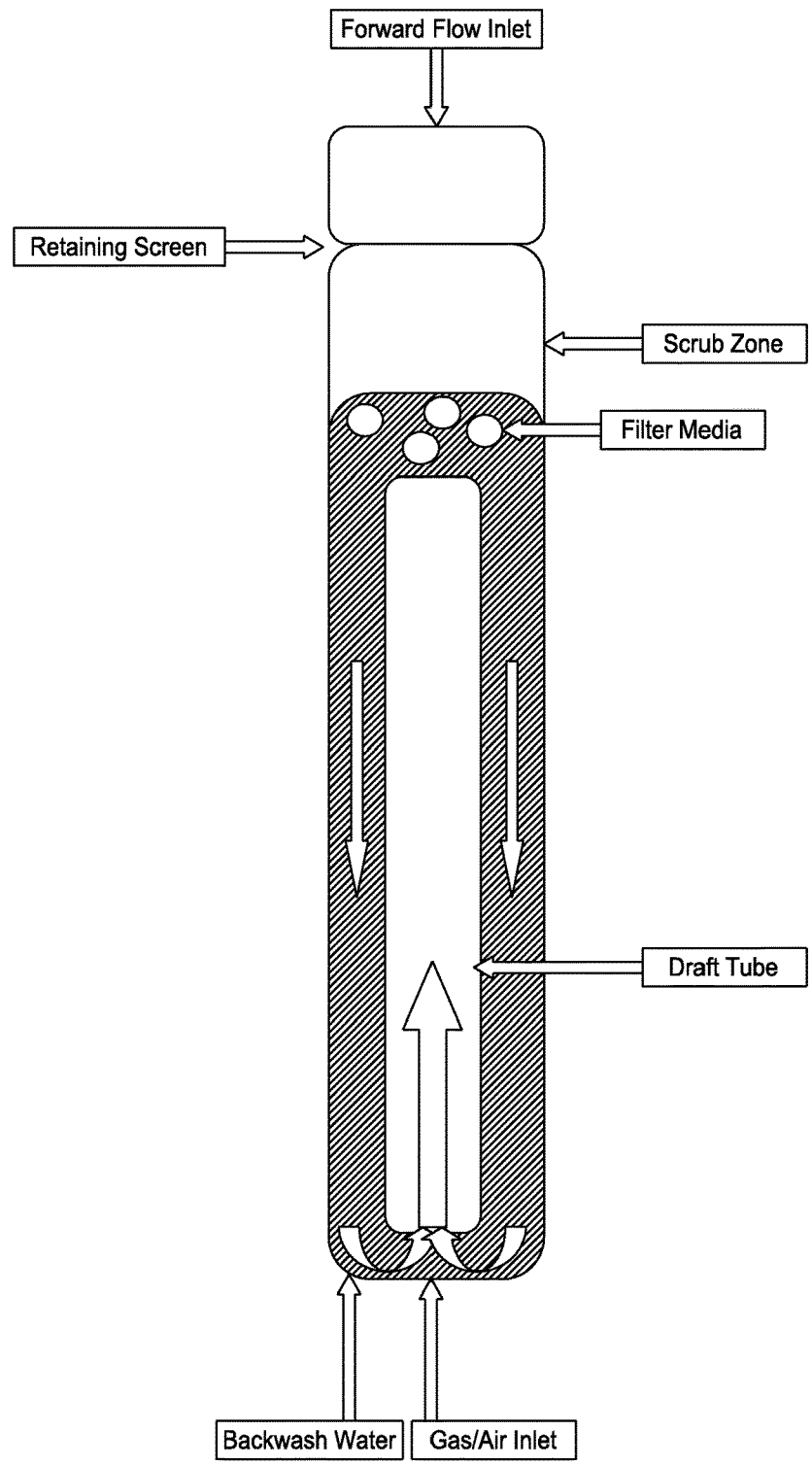
FIG. 4 is a side view of another oil and water separation apparatus in accordance with one or more aspects of the disclosure.

Upon introduction of the gas and the backwash fluid, the stratified multi-media bed 104 expands and moves in countercurrent flows within the vessel 102, as shown in FIG. 4. It is to be noted that FIG. 4 does not include distinct layers of different filter media, but generally indicates the flow of the filter media as a whole. As indicated in FIG. 4, the filter media moves from the top end of the vessel along the outside of the draft tube to the bottom end of the vessel where it may then enter the bottom end of the draft tube adjacent the bottom end of the vessel. The filter media then moves within the interior region of the draft tube from the bottom end of the draft tube to the top end of the draft tube (in a direction counter to the flow of the feed stream during filtration) where it exits the draft tube and enters the peripheral zone of the vessel, thereby partially or completely rolling the bed. While flowing in the draft tube, the filter media may mix, thereby releasing a portion of the oil and suspended solids previously immobilized on the filter media. During backwash, upon exiting the draft tube and entering the peripheral zone, the filter media is in the turbulent scrub zone above the draft tube in which the filter media continues to mix, releasing additional oil and suspended solids. The oil and suspended solids are drawn from the vessel via contaminant outlet 120 in FIG. 1. The gas is also removed from the vessel through the contaminant outlet 120.

Figure 3A:
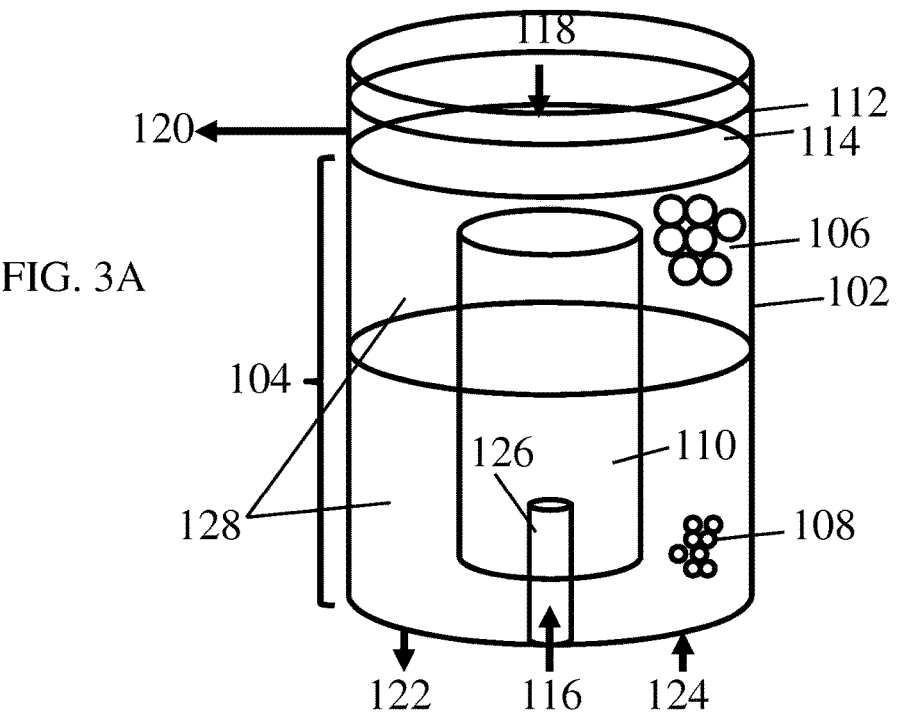
FIGS. 3A and 3B are side views of oil and water separation apparatuses in accordance with one or more aspects of the disclosure.
Figure 3B:
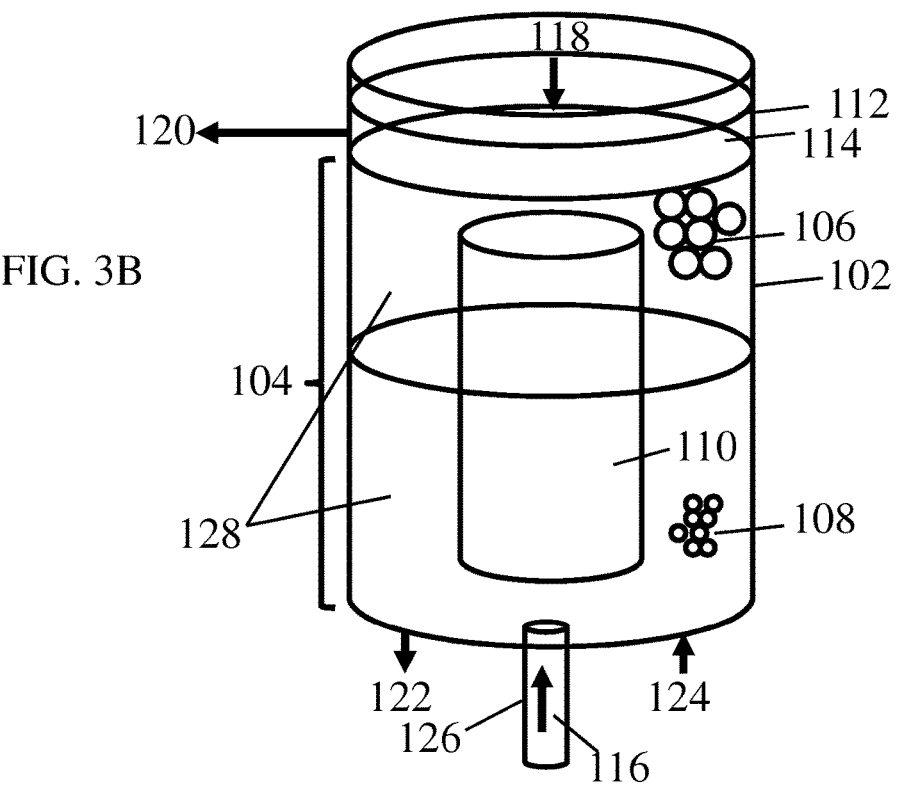

Referring to FIGS. 3A and 3B, the gas inlet 116 may be in communication with a source of gas or any other fluid that may be used to induce movement of the filter media through the draft tube 110. For example, the gas may be air or a produced gas. According to some embodiments, the gas inlet 116 may be positioned within the draft tube 110, as shown in FIG. 3A and may also include a diffuser 126. According to other embodiments, the gas inlet 116 may be positioned below the draft tube 110, as shown in FIG. 3B, and may include a diffuser 126. According to some embodiments, the gas inlet 116 may be positioned below the second layer of filter media 108. The gas inlet 116 may comprise one or more inlets positioned within the vessel to deliver gas to the draft tube system to impart flow of the filter media through the draft tube 110. The gas inlet 116 may have any configuration suitable for delivering the gas to the draft tube 110. For example, the gas inlet may be an orifice, a nozzle, or a jet for delivering gas. According to some embodiments, the gas inlet 116 may also deliver liquid or a combination of gas and a liquid to the draft tube 110.

The filter media apparatus 110 may also include one or more backwash inlets 124 that deliver a backwash fluid to the peripheral zone 128. The backwash fluid inlet 124 may deliver the backwash fluid at or near the bottom wall of the vessel 102 to induce flow or assist in the flow of media toward the bottom end of the draft tube 110. One or more backwash fluid inlets may be positioned within the vessel 102 to provide backwash flow to the vessel 102 and direct filter media toward the draft tube system. The backwash fluid may be a liquid, such as the filtrate or wastewater to be filtered, a gas, such as air, and combinations thereof. According to some embodiments, the backwash fluid is the feed stream diverted from the feed stream inlet or diverted from the treated stream outlet. The backwash fluid inlet 124 may have any configuration suitable for delivering the backwash fluid to the peripheral zone. For example, the backwash fluid inlet 124 may be an orifice, a nozzle, or a jet for delivering a gas, liquid or combination thereof. In certain instances, the backwash fluid inlet 124 may extend into the peripheral zone 128. The backwash fluid inlet 124 may extend from any suitable location to assist in water distribution. For example, the backwash fluid inlet 124 may extend into the peripheral zone 128 from the vessel sidewall and/or from the draft tube sidewall. In another embodiment, the backwash fluid inlet 124 may extend into the peripheral zone 128 at an angle having a component tangential to a sidewall of the vessel.

According to certain aspects, the peripheral zone 128 may also include one or more gas inlets to further agitate the filter media bed. The gas inlets in the peripheral zone may, but need not, be identical to the gas inlet 116 constructed and arranged to deliver gas to the draft tube 110.

The backwash process may further include fluidizing the stratified multi-media bed 104, including the first and second layers of filter media 106 and 108. According to some embodiments, adequate fluidization occurs during the backwash process itself, when the gas and/or backwash fluid are introduced into the vessel. According to other embodiments, fluidization is a separate step at the end of the backwash process. For example, backwash liquid may be introduced through backwash fluid inlet 118 to produce an upflow velocity of fluid into the filter media, which allows larger and less dense particles to segregate to the upper portion of the vessel 102 and smaller and more dense particles to fall to the lower portion of the vessel 102. In addition, in certain instances gas may also be introduced through gas inlet 116. For instance, composite media pellets, which may be sized at 5-30 mesh, and have a specific gravity and density that is lower than walnut shells, may segregate and settle in the upper portion of the vessel 102. In a similar manner, in reference to FIG. 2, a second layer of composite media 106B may include pellets that have a specific gravity that is higher than a specific gravity pellets positioned within a first layer of composite media 106A, and therefore may settle in the lower portion of the vessel 102. According to some embodiments, fluidization of the first and second layers of filter media 106 and 108 (or 106A and 106B) may be done for a predetermined time. Further, the process may include allowing the first and second layers of filter media 106 and 108 to settle, which may include pulsing gas, as discussed below.

According to some embodiments, upon completion of the backwash cycle, setting of the stratified multi-media bed 104 may be further aided by introducing a form of energy so as to settle and/or stratify the layers of the filter media bed. For example, vibrational or other disruptive forms of mechanical energy may be applied to the vessel and/or layers of filter media directly or indirectly so as to adequately segregate the layers. According to some examples, gas may be introduced, such as air or produced gas, through the gas inlet 116 and draft tube 110 to disturb the media sufficiently to allow segregation and resettling. In certain instances, the gas may be introduced intermittently during the bed settling stage. In some instances, the bed may be allowed to settle by gravity between pulses of gas.

According to another embodiments, a plurality of filter media apparatuses are used to provide continuous filtration while one or more filter media units are off line operating in a backwash cycle. For instance, a feed stream may be fed in parallel to a plurality of filter media apparatuses. The feed stream to one of the filter media apparatuses may be interrupted while flow of the feed stream to the remaining filter media apparatuses continues. The filter media apparatus taken offline may then be backwashed and have its bed set before being brought back into service. Once the filter media apparatus is brought back into service, another of the filter media apparatuses may be taken out of service for backwashing.

Figure 5:
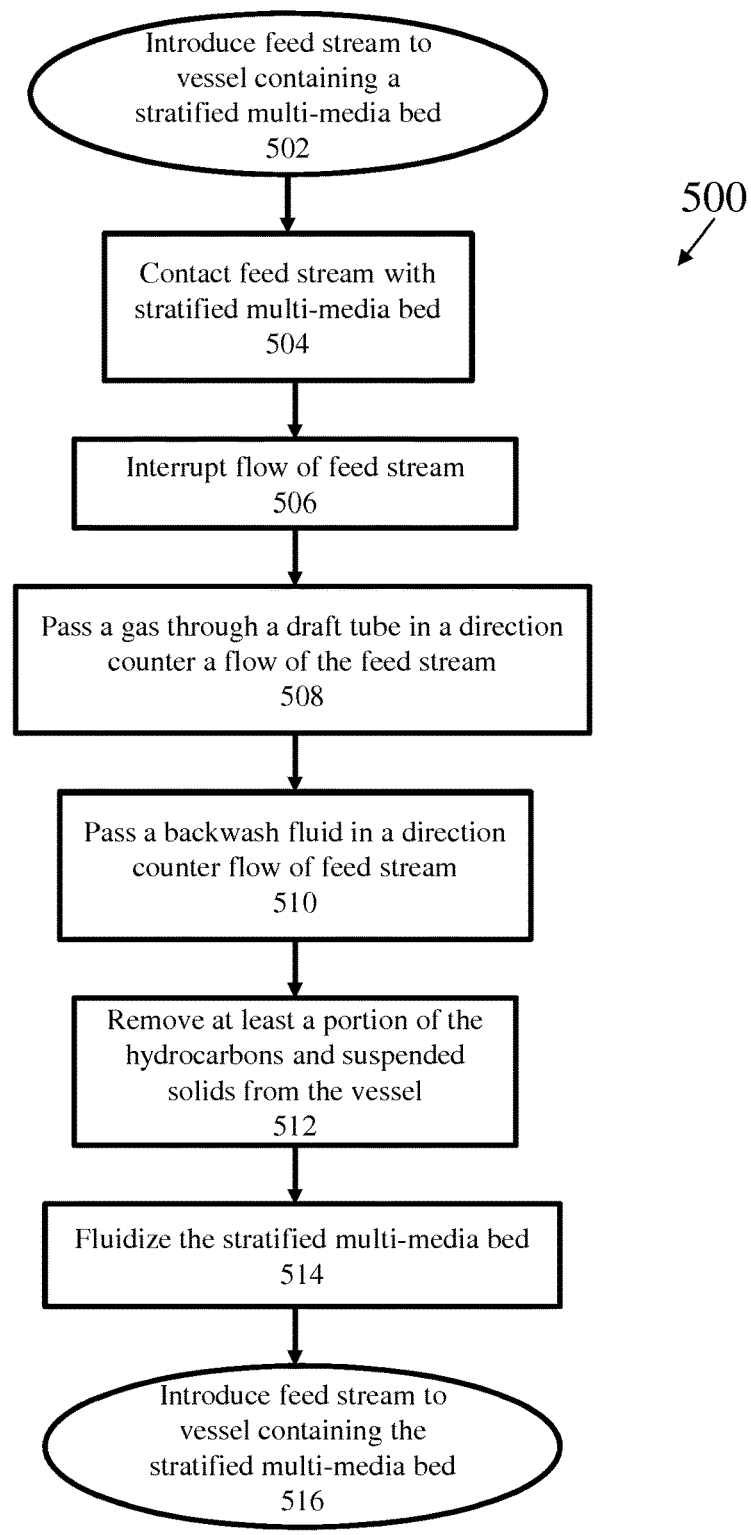
FIG. 5 is a process flow diagram illustrating a method in accordance with one or more aspects of the disclosure.

FIG. 5 is a process flow diagram illustrating at least one process, generally indicated at 500, that is in accordance with one or more aspects of the disclosure. In FIG. 5, step 502 includes introducing a feed stream comprising hydrocarbons, suspended solids, and an aqueous-based liquid to a vessel containing a stratified multi-media bed. For example, the stratified multi-media bed may include a first layer of filter media and a second layer of filter media positioned below the first layer of filter media, and the first layer of filter media may have a specific gravity with a value that is less than a value of a specific gravity of the second layer of filter media. Further, at least one of the first layer of filter media and the second layer of filter media may comprise a comprise composite media, such as a plurality of composite media pellets, where each composite media pellet comprises a mixture of cellulose-based material and a polymer. At step 504, the process further includes contacting the feed stream with the stratified multi-media bed. For example, the process may include contacting the feed stream with the first layer of filter media and the second layer of filter media to produce a treated stream having a concentration of hydrocarbons that is less than a concentration of hydrocarbons in the feed stream. For instance, contacting the feed stream with the first layer and the second layer of filter media may comprise coalescing and filtering the feed stream. At step 506, the flow of the feed stream is interrupted. This may happen when the pressure drop across the vessel reaches a predetermined limit, indicating that a backwash process is necessary. For instance, a sensor may measure at least one property of the vessel to provide a measured property of the vessel, and backwashing may commence based on the measured property. For example, a sensor may monitor the pressure in the vessel to determine if the pressure drop has reached a predetermined value that initiates the backwash cycle. According to another embodiment, a predetermined amount of time may pass before the flow of the feed stream is interrupted and the backwash cycle is initiated. At steps 506 and 508 a gas and a backwash fluid are passed into the vessel in a direction counter the flow of the feed stream. For example, a gas may be passed through a draft tube that is located within the vessel and positioned within the stratified multi-media bed. For instance, the draft tube may be positioned within the first layer of filter media and the second layer of filter media and may form a peripheral zone positioned between a sidewall of the draft tube and a sidewall of the vessel. The backwash fluid may be passed through the stratified multi-media bed, for example, through the first and second layers of filter media and the peripheral zone. These steps function to roll the bed of filter media, and thereby release at least a portion of the contaminants such as the hydrocarbons and suspended solids from the filter media, which is then removed from the vessel at step 512. At step 514 the stratified multi-media bed is fluidized, as discussed above, to separate the layers of filter media from one another and allowing the layers to settle. For instance, the first and second layers of filter media may be fluidized by passing at least one of the gas and the backwash fluid through the first and second layers of filter media for a predetermined time. According to at least one embodiment, fluidization of the filter media bed may occur during the backwash cycle itself, and thus a separate step of introducing an upward velocity of gas and/or backwash fluid may not be necessary. At step 516 the flow of the feed stream to the vessel containing the stratified multi-media bed is reestablished.

EXAMPLES

The systems and methods described herein will be further illustrated through the following examples, which are illustrative in nature and are not intended to limit the scope of the disclosure.

Example 1—Stratified Media

An experiment was conducted to evaluate the effectiveness of a multi-media stratified bed assembly. A vessel constructed from stainless steel and having a height of 78 inches and a diameter of six inches was first filled with a 12 inch deep layer of black walnut shells sized at 12-16 mesh. A 54 inch layer of composite media sized at 5-10 mesh (4 mm round pellet) and containing 45% HDPE and 55% maple wood was then placed on top of the black walnut shell layer to create a multi-media stratified bed. Synthetic wastewater was created to simulate primary separation effluent by injecting crude oil and suspended solids into tap water to create a synthetic wastewater having a hydrocarbon concentration of 250 mg/L and a TSS concentration of 40 mg/L. The synthetic wastewater was heated to 90° C. and then pumped at a flux rate of 10 gpm/ft$^2$ into the top of the vessel and out the bottom of the vessel, such that it first passed through the layer of composite media before passing through the layer walnut shell media and out the vessel as effluent.

Figure 6:
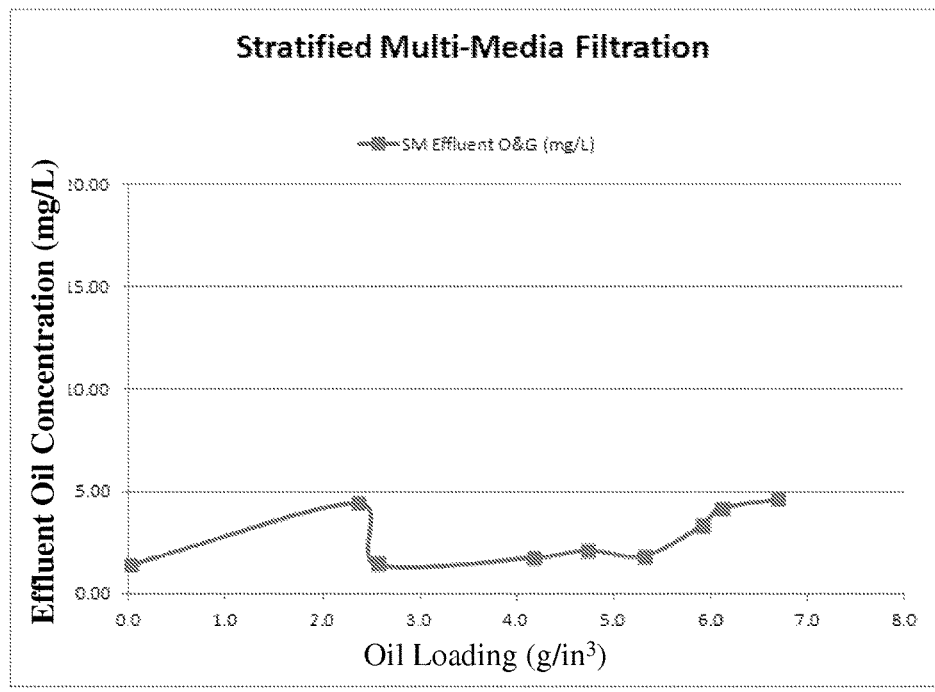
FIG. 6 is a graph illustrating results from multi-media testing in accordance with one or more aspects of the disclosure.

The experiment was conducted for 24 hours, with 9 samples collected from the effluent of the vessel and tested for hydrocarbon concentration. The results are presented in FIG. 6, with all 9 samples indicating a hydrocarbon concentration of less than 5 mg/L.

Example 2—Bed Depth Comparison

Figure 7:
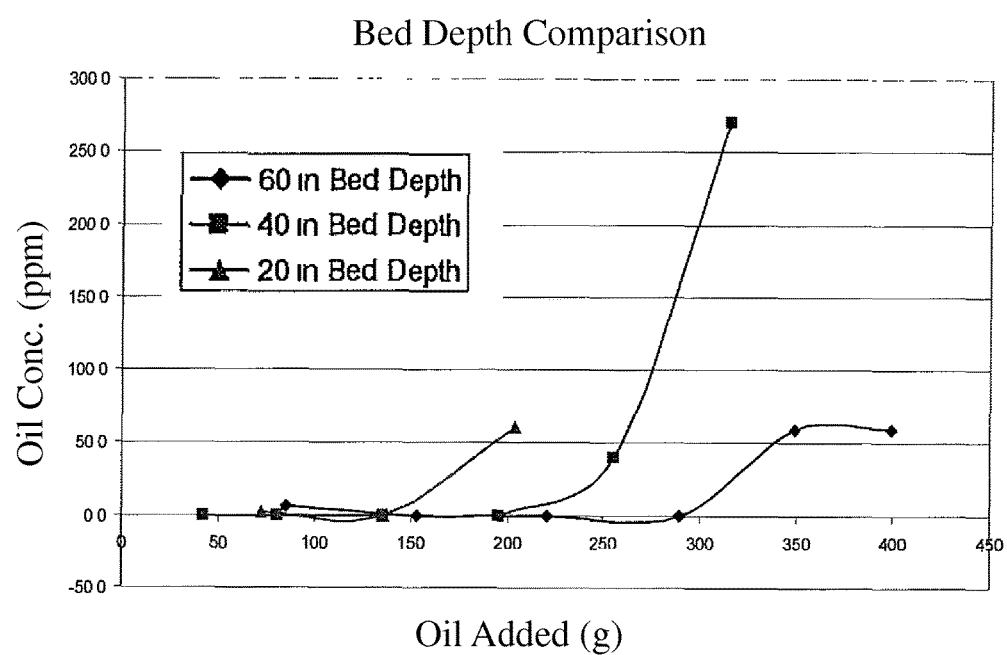
FIG. 7 is a graph illustrating results from multi-media testing in accordance with one or more aspects of the disclosure.

An experiment was performed to compare the performance capability of multi-media stratified bed assemblies having different proportions of media. A vessel similar to the one described above in reference to Example 1 was filled with 10 inches of black walnut shell media sized at 12-16 mesh and then filled with 20 inches, 40 inches, and 60 inches of composite media (same composite media as Example 1) sized at 5-10 mesh to test three different volumetric proportions of media. A feed stream having a hydrocarbon concentration of 250 mg/L and a specific gravity of 0.98 was pumped through the bed of composite media bed and the bed of walnut shells, respectively, at a flux rate of 13.5 gpm/ft$^2$. The mass of oil loaded per cubic inch of media was plotted versus the concentration of oil in the effluent and is presented in FIG. 7. The results indicated that approximately 60 inches of composite media and 10 inches of walnut shells is effective to collect in the range of 0.5 g/in$^3$-5 g/in$^3$ of oil, depending on the specific gravity of the oil. Further, the results indicate that all three depths of the composite media tested were capable of yielding an effluent with less than 5 mg/L, with the length of time between backwashes being shortest for the 20 inch composite media bed and longest for the 60 inch composite media bed.

Example 3—Multi-Media Performance Capabilities

An experiment was performed to compare the performance capability of a single layer of composite media and a stratified multi-media bed containing a first layer of composite media and a second layer of walnut shell media. Testing was conducted with the composite media, synthetic wastewater, and same conditions as described above in reference to Example 1. A stainless steel vessel was used that was seven feet tall and six inches in diameter and was equipped with a draft tube and an air inlet nozzle for backwashing.

Testing with the single layer of composite media was performed using a 66 inch deep bed. Testing with the stratified multi-media bed was performed using a 54 inch bed of composite media and a 12 inch bed of walnut shells positioned below the composite media.

Figure 8A:
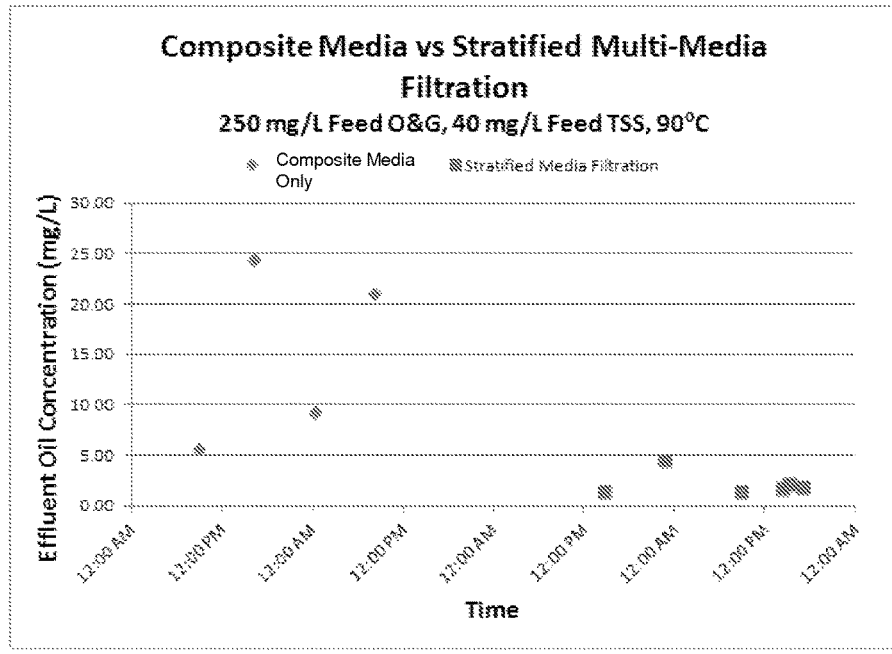
FIGS. 8A and 8B are graphs illustrating results from multi-media testing in accordance with one or more aspects of the disclosure.
Figure 8B:
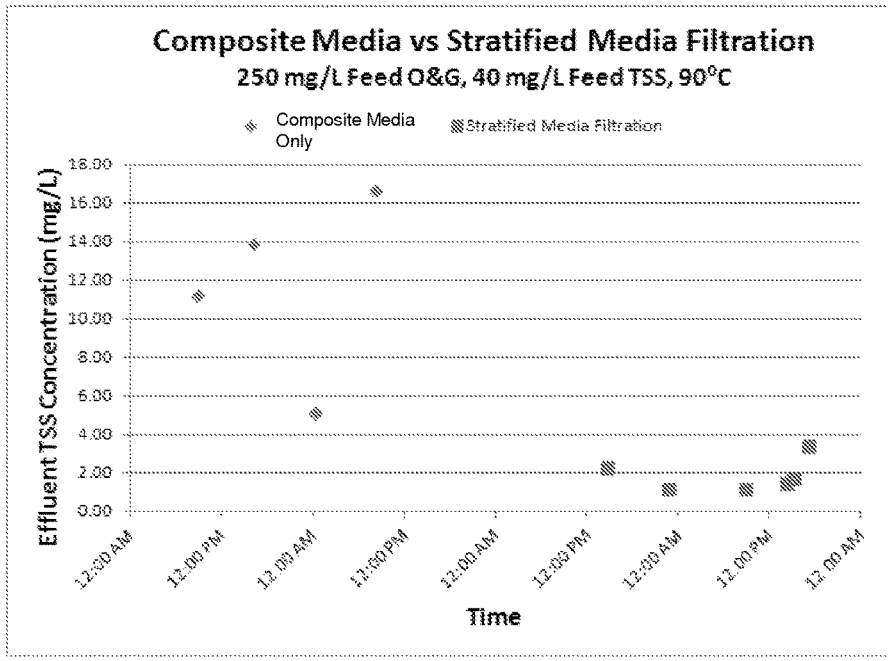

The results from passing the synthetic wastewater through both types of filter media beds for 24 hours are shown in FIGS. 8A and 8B, with FIG. 8A showing the hydrocarbon concentration in the effluent and FIG. 8B showing the concentration of suspended solids in the effluent. FIGS. 8A and 8B indicate that the stratified multi-media bed was more effective at filtering both the hydrocarbons and suspended solids in the feed wastewater stream than the composite media alone. For example, the effluent from the stratified multi-media bed averaged a hydrocarbon concentration of about 2.20 mg/L (99.1% removal), whereas the effluent from the single layer of composite media averaged 15.23 mg/L (93.9% removal). Further, the effluent from the stratified multi-media bed had an average TSS concentration of 1.87 mg/L (95.3% removal), whereas the effluent from the single composite media bed had an average TSS concentration of 1.87 mg/L (70.7% removal).

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

The invention claimed is:

1. A system for treating a feed stream comprising hydrocarbons and an aqueous-based liquid, the system comprising:
   a vessel comprising a feed stream inlet fluidly connected with the feed stream and a treated stream outlet fluidly connected with a treated stream; and
   a filter bed positioned within the vessel and comprising a first layer of filter media disposed on a second layer of filter media,
   wherein at least the first layer comprises a plurality of composite media particles, each of the plurality of composite media particles comprising a mixture of a cellulose-based material and a polymer, and
   wherein the filter media of the first layer comprises a lower density than that of the second layer.

2. The system of claim 1, wherein the second layer comprises a plurality of composite media particles, each of the plurality of composite media particles of the second layer also comprising a mixture of a cellulose-based material and a polymer, and wherein the composite media particles of the first layer comprise a larger particle size than the composite media particles of the second layer.

3. The system of claim 1, wherein the second layer of filter media comprises walnut shells.

4. The system of claim 1, wherein the second layer comprises a plurality of composite media particles, each of the plurality of composite media particles of the second layer also comprising a mixture of a cellulose-based material and a polymer, and wherein the second layer further comprises an additive effective to provide the second layer with a greater specific gravity than the first layer.

5. The system of claim 1, wherein a volume of the first layer is at least twice that of a volume of the second layer.

6. The system of claim 1, further comprising:
   a draft tube located within the vessel and positioned within the first layer of filter media and the second layer of filter media;
   a gas inlet in communication with the draft tube;
   a source of gas in communication with the gas inlet;
   a backwash fluid inlet fluidly connected to a source of backwash fluid and at least one of the first layer of filter media or the second layer of filter media; and
   a contaminant outlet fluidly connected to the vessel.

7. A process for treating a feed stream comprising hydrocarbons and an aqueous-based liquid, the process comprising:
   introducing the feed stream to a vessel containing a first layer of filter media and a second layer of filter media, wherein at least the first layer comprises a plurality of composite media particles, each of the composite media particles comprising a mixture of cellulose-based material and a polymer, and wherein the filter media of the first layer comprises a lower density than that of the second layer; and
   contacting the feed stream with the first layer of filter media and subsequently the second layer of filter media to produce a treated stream having a concentration of hydrocarbons less than a concentration of hydrocarbons in the feed stream.

8. The process of claim 7, wherein the second layer of filter media comprises walnut shells.

9. The process of claim 7, wherein the second layer also comprises a plurality of composite media particles, each of the composite media particles comprising a mixture of cellulose-based material and a polymer, and wherein the second layer further comprises an additive effective to provide the second layer with a greater specific gravity than the first layer.

10. The process of claim 7, wherein the feed stream further comprises suspended solids, and wherein contacting the feed stream with the first layer of filter media and the second layer of filter media produces a treated stream having a concentration of suspended solids less than a concentration of suspended solids in the feed stream.

11. The process of claim 7, further comprising:
   passing a gas through a draft tube in a direction counter a flow of the feed stream, the draft tube located within the vessel and positioned within the first layer of filter media and the second layer of filter media and forming a peripheral zone positioned between a sidewall of the draft tube and a sidewall of the vessel;

passing a backwash fluid through the first and second layers of filter media and the peripheral zone in a direction counter the flow of the feed stream; and
removing at least a portion of the hydrocarbons from the vessel.

* * * * *